| United States Patent [19] | [11] 4,029,851 |
|---|---|
| Degenhardt | [45] June 14, 1977 |

[54] LUMINESCENT MATERIAL AND X-RAY INTENSIFIER FOIL CONTAINING THE SAME

[75] Inventor: Heinz Degenhardt, Erlangen, Germany

[73] Assignee: Siemens Aktiengesellschaft, Berlin & Munich, Germany

[22] Filed: Dec. 17, 1975

[21] Appl. No.: 641,573

[30] Foreign Application Priority Data

Dec. 23, 1974 Germany .................... 2461260

[52] U.S. Cl. ................ 428/539; 250/483; 252/301.4 H
[51] Int. Cl.² ................................ C09K 11/46
[58] Field of Search ............ 252/301.4 H; 250/458, 250/460, 475, 483; 428/539

[56] References Cited

UNITED STATES PATENTS

| 3,591,516 | 7/1971 | Rabatin | 252/301.4 H |
| 3,666,676 | 5/1972 | Rabatin et al. | 252/301.4 H |

*Primary Examiner*—Jack Cooper
*Attorney, Agent, or Firm*—Hill, Gross, Simpson, Van Santen, Steadman, Chiara & Simpson

[57] ABSTRACT

A luminescent material which is stimulable or excitable through the intermediary of X-rays for the emission of photographically effective light, and which consists of activated lanthanum oxide halogenide. A portion of the lanthanum is replaced by lead and/or thalium in the luminescent material. Thereby, at a reduced afterglow there are obtained crystals with an approximately spherical shape, so that the granularity, as well as the afterglow are reduced.

3 Claims, 3 Drawing Figures

LUMINESCENT MATERIAL AND X-RAY INTENSIFIER FOIL CONTAINING THE SAME

Field of the Invention

The present invention relates to a luminescent material which is stimulable or excitable through the intermediary of X-rays for the emission of photographically effective light, and which consists of activated lanthanum oxide halogenide. As is known, fluorescent or luminescent materials of this type are utilized in order to convert X-rays into light, the latter of which is transmitted to an observation or photographic system responsive to this light, and which is more sensitive with respect to this light as compared to X-rays themselves. Hereby, sensitive exposure or photographic systems are such as the photofilms or photocathodes of a luminescent material-photocathode sandwich arrangement, as would be utilized in X-ray image intensifiers and X-ray television camera tubes.

Discussion of the Prior Art

In known arrangements, meaning luminescent screens, there are employed oxihalogenides of the rare earths or lanthanide series, which are activated with terbium or another element, in the form of well shaped and essentially stoichiometric component containing crystals. The terbium hereby constitutes up to 30 mole %. Moreover, there may also be present a sensitized quantity of 0.1 to 1 mole % of cerium. As the still missing component, the halogenide should be constituted from the group encompassing one or more of chlorine, bromine or iodine. When, as the lanthanides in this luminescent materials, lanthane or gadolinium are designated as Ln, then there may be ascribed to the known luminescent material the formula $LnOX:Tb^{3+}(:Ce)$. However, encountered in this luminescent material is the disadvantage that, upon stimulation with X-rays light is emitted primarily in the green spectral range. Usual X-ray films, however, have their maximum responsiveness in the blue spectral range. Insofar as it desired to obtain an optimum conversion, it is necessary to employ a special film which is sensitized particularly to this green light. Moreover, the mentioned luminescent or fluorescent materials are more or less hygroscopic so as to lose their luminescent power with time through moisture absorption. This is predicated on that most organic binding agents absorb water from the air during the course of time, so that the luminescent material changes under the formation of lanthanum hydroxide. Under this influence of the moisture, the luminescent capacity thus constantly reduces.

In accordance with an earlier proposal there is provided a luminescent material in which the above-mentioned advantages are avoided and which is thereby durable also in moist air and optimally converts X-rays into light within a spectral band (blue light) which has a good effect on commercially available photographic material, from a solid solution of the summation formula $LaOFX:Ce$ $(:Y)$. Symbolized hereby are La = lanthanum, O = oxygen, F = fluoride, $x$ = at least one other halogenide, Ce = Cerium which is applied in activating concentrations, meaning, of $10^{-4}$ to $10^{-2}$ g atom/mole LaOFX, and Y = at least one of the rare earth elements, Tb = Terbium and Er = Erbium in a quantity of from 0 to $10^{-2}$, in particular, $10^{-4}$ g atom/mole LaOFX.

The luminescent material, upon stimulation through X-rays delivers sufficient blue fluorescence. Thereby it also effects well darkeningly on the usual film material. However, the film darkening, compared to the usual X-ray luminescent materials, such as calcium tungstamate, is three to four times as high under the same conditions. Moreover, the luminescent material is stable with respect to water and solvent media, as well as temperature, so as to be able to readily withstand all influences occurring during use and during manufacture.

In the further processing of the above-mentioned luminescent material which led to the invention, it has been ascertained that in its utilization in the X-ray technology, notwithstanding all advantages, there must be assumed lengthy afterglow periods. This is detrimental to completely specialized applications in which the film must be rapidly changed within fractions of seconds. For example, this is the case with the so-called cassette changer by means of which there are produced five exposures per second. Moreover, the earlier luminescent material produced in accordance with the above discussion of the background of the invention is obtained in coarse crystals so that, in its application in amplifier screens, in the preparation of exposures there are obtained film pictures having an extremely coarse granularity. The foregoing is apparently based on the formation of the luminescent material in the form of flat or tabular crystals. This effect is amplified still further in that these crystals easily grow together into grape-like clusters.

The present invention provides a luminescent material excitable by X-rays consisting essentially of activated lanthanum-lead oxybromide crystals wherein the lead content is in the range of 0.01 to 10 mole percent said mole percent being based on the mole content of lanthanum and lead, and including terbium as an activator, said luminescent material having the general formula: $(La,Pb)$ $OBr:Tb$.

As a preferred embodiment, there is provided a luminescent material wherein said lead content is 1.0 mole percent, and the terbium content is 0.5 mole percent.

Summary of the Invention

Accordingly, it is an object of the present invention to so vary the habitus or physical appearance of the crystals in a lanthanum oxide halogenide luminescent material whereby the granularity is reduced and, moreover, the afterglow is eliminated.

Inventively, the aforementioned object is attained in that a portion of the lanthanum is replaced by lead and/or thalium in the luminescent material. Thereby, at a reduced afterglow there are obtained crystals with an approximately sperical shape, so that the granularity, as well as the afterglow are reduced.

A partial replacement of the lanthanum $La^{3+}$ with an ionic radius of 0.120 nm is facilitated due to the similar ionic radius of lead $Pb^{2+}$ with 0.132 nm, and respectively thalium $Tl^{3+}$ with 0.105. The required charge equalization can be carried out through anion leakages or the formation of a mixing phase. There is thus obtained a luminescent material having the general formula $(La, Pb)OBr:Tb$, respectively $(La, Tl)OBr:Tb$, or $(La, Pb, Tl)OBr:Tb$ which envices the mentioned advantageous properties in their context of utilization in X-ray diagnosis.

In a simple manner there is obtained, in an exemplary embodiment, in the production of an inventive luminescent pigment, an extremely finely crystalline luminescent material, in which a portion of the lanthanum is replaced by lead, when 1303 g lanthanum oxide ($La_2O_3$) are mixed with 2.74 g terbium oxide ($Tb_2O_3$), 14.68 g lead bromide ($PbBr_2$) and 912 g ammonium bromide ($NH_4Br$), mixed in a ball mill and subsequently heated in a covered crucible for about 2 hours to 450° C. This heating is, in the present instance, suitably set to a temperature in the range between 400 and 500° C., so that the transition of the bromide from ammonium bromide to the formation of oxibromide reaches a useable speed and thereby also no disruptive bromide losses due to vaporization need be taken into consideration. The transition of the bromide is additionally aided through the utilization of the large excess of bromide, meaning, primarily of ammonium bromide. After completion of the heating there is obtained a lanthanum oxide bromide which is still not capable of luminescence since it is still lacking the required crystalline shape. This shape is obtained in a simple manner in that the product obtained in the prementioned "Temper-Process" is annealed with a smelting medium, such as with 50 g potassium bromide (KBr). The mixture is additionally annealed for 2 hours in the covered crucible, meaning, heated to 900° C. At the temperature of 900° C. there is exceeded the temperature of about 800° C. at which there commences the formation of the crystals which are capable of luminescences, but still not the formation of large crystals obtained in the neighborhood of about 1000°. Pursuant to the indicated process there is then obtained a finely crystalline fluorescent or luminescent material which is extremely effective in the conversion of X-rays. The actual crystals, which are almost idiomorphic, meaning, free of intergrowths and aggregate formations, are then finally obtained from the annealed product through one of the known purification processes, which is then washed free of soluble components, in particular freed of potassium bromide. As flow media for the propagation of the recrystallization of the luminescent material there may also be used, in addition to potassium bromide, sodium bromide or sodium carbonate.

The above-mentioned process may be considerably simplified in that the mixture, which preferably also contains a flow medium, is slowly heated from room temperature to 900° C. and then annealed for two hours. Hereby, care must be exercised in particular with regard to the heating speed, that a sufficient quantity of the introduced bromide remains in the mixture for at least so long until the oxide bromide has been formed.

Brief Description of the Drawings

Further details and advantages of the invention may now be ascertained in the utilization of the luminescent material from the following description thereof, taken in conjunction with the accompanying drawings; in which.

Detailed Description

Figure 1:
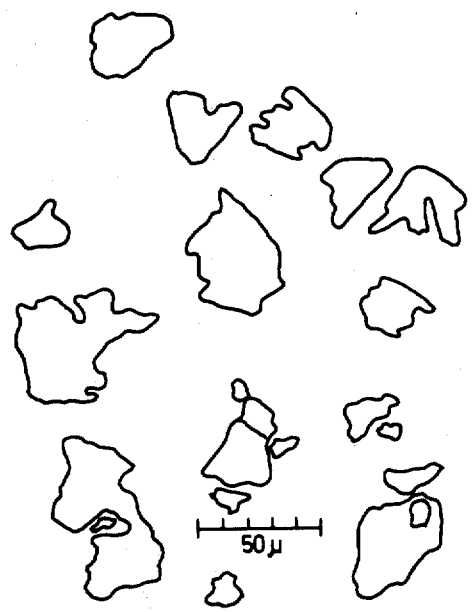
FIG. 1 illustrates the crystals of lanthanum oxide bromide obtained through known processes, which is activated with terbium (LaOBr:Tb)
Figure 2:
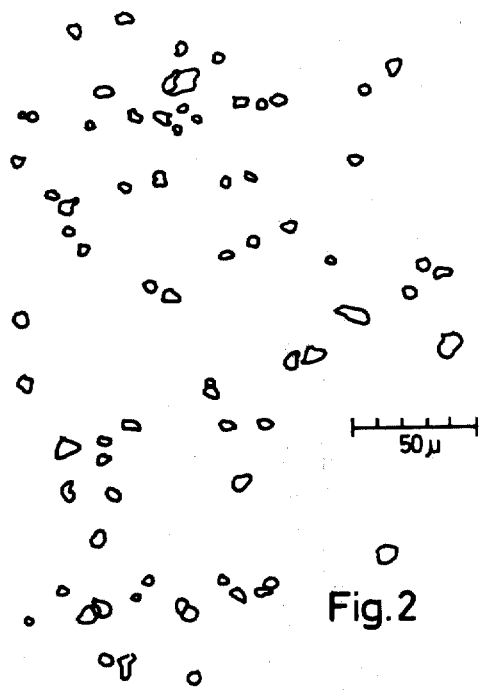
FIG. 2 illustrates crystals of the inventive luminescent material.

From a comparison of the drawn exposures of known (FIG. 1) and new (FIG. 2) preparations shown in FIGS. 1 and 2 there is ascertained a clear distinction. This consists of in that the crystals of the inventive luminescent material (La, Pb)OBr:Tl are substantially smaller and extensively free of agglomerations and the like.

Figure 3:
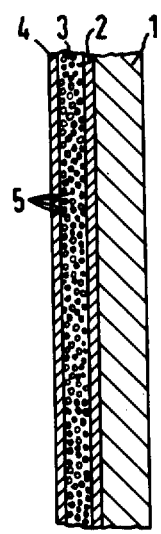
FIG. 3 shows a fragment through the cross-section of an X-ray intensified foil, in which there are employed in the luminescent material crystals of the type illustrated in FIG. 2.

In FIG. 3 of the drawing, designated by reference numeral 1 is a carrier foil on which there is located a reflective layer 2, and thereon a luminescent layer 3. At this surface the luminescent layer is additionally coated by a so-called protective layer 4. Thereby the carrier 1 is constituted of polyester and is 0.2 mm thick. The reflective layer 2 consists of the application of a mixture of titanium dioxide $TiO_2$, meaning, anatas pigment, and polyvinyl acetate binder medium, and is 20 $\mu m$ thick. The actual fluorescent or luminescent layer contains the inventive luminescent material, which is symbolized by means of the points 5, in a polyvinyl butyral binder medium. The application of the material is carried out in a known manner in that the binder medium is dissolved in methylglycolacetate and, together with the luminescent material, processed into a suspension. The binder medium content of the luminescent layer, in the present instance, consists of 15%. It is applied to the reflective layer 2 so as to produce a 100 $\mu m$ thick layer which contains 30 mg of luminescent material per $cm^2$. The luminescent layer 3 is then further coated with a protective layer 4 which is 10 $\mu m$ thick and constituted of an acrylic resin. This is then applied as a 10% solution on the surface of the luminescent layer, and thereby produces the protective layer 4.

While there has been shown what is considered to be the preferred embodiment of the invention, it will be obvious that modifications may be made which come within the scope of the disclosure of the specification.

What is claimed is:

1. A luminescent material excitable by X-rays consisting essentially of terbium activated lanthanum-lead oxybromide crystals, wherein the lead content is in the range of 0.01 to 10 mole percent said mole percent based on the mole content of lanthanum and lead, said luminescent material having the general formula:

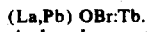
(La,Pb) OBr:Tb.

2. A luminescent material as claimed in claim 1, wherein said lead content is 1.0 mole percent, and the terbium content is 0.5 mole percent.

3. An X-ray intensifier foil, comprising a luminescent layer supported on a carrier foil, said luminescent layer containing a luminescent material consisting essentially of terbium activated lanthanum-lead oxybromide crystals wherein the lead content is in the range of 0.01 to 10 mole percent said mole percent based on the mole content of lanthanum and lead, and said luminescent material having the general formula:

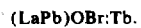
(LaPb)OBr:Tb.

* * * * *